US009367294B2

(12) United States Patent
Gnanasambandam et al.

(10) Patent No.: US 9,367,294 B2
(45) Date of Patent: Jun. 14, 2016

(54) SYSTEMS AND METHODS FOR DISAMBIGUATING DIALECTS IN LIMITED SYNTAX LANGUAGES TO REDUCE SYSTEM FRAGILITY

(75) Inventors: Shanmuganathan Gnanasambandam, Victor, NY (US); Jonathan Levine, Rochester, NY (US); Gueyoung Jung, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 665 days.

(21) Appl. No.: 13/229,853

(22) Filed: Sep. 12, 2011

(65) Prior Publication Data
US 2013/0067434 A1 Mar. 14, 2013

(51) Int. Cl.
G06F 3/12 (2006.01)
G06F 9/45 (2006.01)
G06F 17/22 (2006.01)
G06F 17/27 (2006.01)

(52) U.S. Cl.
CPC .............. G06F 8/51 (2013.01); G06F 3/1244 (2013.01); *G06F 17/2211* (2013.01); *G06F 17/2288* (2013.01); *G06F 17/2785* (2013.01)

(58) Field of Classification Search
None
See application file for complete search history.

(56) References Cited

U.S. PATENT DOCUMENTS

| 5,974,248 | A  | * | 10/1999 | Graef ............................ 703/22 |
|-----------|----|---|---------|-----------------------------------------|
| 6,049,390 | A  | * | 4/2000  | Notredame et al. ......... 358/1.15 |
| 6,219,149 | B1 | * | 4/2001  | Kawata et al. ............... 358/1.15 |
| 6,662,270 | B1 | * | 12/2003 | Sans et al. ...................... 711/118 |
| 6,963,412 | B1 | * | 11/2005 | Toda ............................. 358/1.13 |
| 7,256,901 | B2 | * | 8/2007  | Ferlitsch ...................... 358/1.13 |
| 7,643,166 | B2 | * | 1/2010  | Murakami .................... 358/1.15 |
| 2006/0170944 | A1 | * | 8/2006 | Arps et al. .................... 358/1.13 |
| 2006/0212805 | A1 | * | 9/2006 | Allen .................... G06F 17/212 715/234 |
| 2009/0190156 | A1 | * | 7/2009 | Iwadate ........................ 358/1.14 |
| 2010/0020351 | A1 | * | 1/2010 | Ishizuka ...................... 358/1.15 |
| 2012/0030151 | A1 | * | 2/2012 | Huang et al. ................... 706/12 |

OTHER PUBLICATIONS

"The Authoritative Dictionary of IEEE Standards Terms, Seventh Edition," in IEEE Std 100-2000 , pp. 432 & 1188, Dec. 11, 2000, URL: http://ieeexplore.ieee.org/stamp/stamp.jsp?tp=&arnumber=4116787&isnumber=4116786.*

Spitz et al., "Document Analaysis Systems", 1995, World Scientific Publishing Co., p. 30, URL: https://books.google.com/books?id=wovsCgAAQBAJ.*

\* cited by examiner

*Primary Examiner* — Li B Zhen
*Assistant Examiner* — Joanne Macasiano
(74) *Attorney, Agent, or Firm* — MH2 TECHNOLOGY LAW GROUP LLP

(57) ABSTRACT

An embodiment generally relates to systems and methods for improving system performance by reducing fragility of computing systems. A processing module can identify separate ensemble files each comprising interpretations, by separate entities of a workflow, of a phrase in a file. The processing module can compare the interpretations to determine if the interpretations are the same or essentially the same. If the interpretations are neither the same nor essentially the same, a subsequent entity in the workflow can create a new file that replaces an associated interpretation of the phrase with a common interpretation. The subsequent entity can proceed with an intended operation.

12 Claims, 4 Drawing Sheets

SYSTEMS AND METHODS FOR DISAMBIGUATING DIALECTS IN LIMITED SYNTAX LANGUAGES TO REDUCE SYSTEM FRAGILITY

FIELD OF THE INVENTION

This invention relates generally to programming and, more particularly, to systems and methods for reducing system fragility in programming languages.

BACKGROUND OF THE INVENTION

Scientists and linguists have long attempted, with the improved understanding of the nature of grammar, to develop computers that can understand and respond to human language. However, the attempts have mostly been intractable due, in part, to the meaning or semantics of language that can be ambiguous except under the most stringent constraints. In particular, the meaning of language is often subjective to each individual. Much of the meaning that one person derives from a phrase is based on her or her own experiences, interpretation of those experiences, expectations and understandings resulting from those interpretations, and the mapping of those expectations and understandings to the statement. Further, phrases are often naturally ambiguous, even under a detailed objective analysis.

The same ambiguity can be applied to phrases expressed in limited-syntax languages such as programming languages, in part because the system components that produce phrases (the "speakers") and the consumers that access them (the "listeners") are created by people who have their own independent ideas about how to structure or read those phrases to make them meaningful. As a result, each system component is capable of "speaking" and "understanding" only one or a few dialects of a language, but not all of the dialects, which can lead to system fragility. The effects can be seen in, for example, print workflows in which each component uses Postscript®, an industry-standard programming language available from Adobe® and others, and used to describe, to printing systems, how a printed document should look. Further, the effects can be seen in portable document format (PDF) workflows, and in other computing systems. The effects can add cost, bugs, and complexity to computing systems.

Therefore, it may be desirable to have systems and methods for improving system performance by reducing fragility of computing systems. In particular, it may be desirable to have systems and methods for reducing ambiguities in language semantics among computing system components.

SUMMARY

An embodiment pertains generally to a method of processing data. The method comprises identifying a file comprising a phrase describing the file, and an ensemble file comprising an interpretation, by a first entity, of the phrase. The method further comprises identifying an additional ensemble file comprising an additional interpretation, by a second entity, of the phrase. Further, the method comprises comparing, by a processor, the interpretation to the additional interpretation, and providing a result of the comparison to the second entity.

Another embodiment pertains generally to a system for processing data. The system comprises a processor coupled to memory and configured to identify a file comprising a phrase describing the file, and an ensemble file comprising an interpretation, by a first entity, of the phrase. In embodiments, the processor is configured to identify an additional ensemble file comprising an additional interpretation, by a second entity, of the phrase. Further, the processor is configured to compare the interpretation to the additional interpretation and provide a result of the comparison to the second entity.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
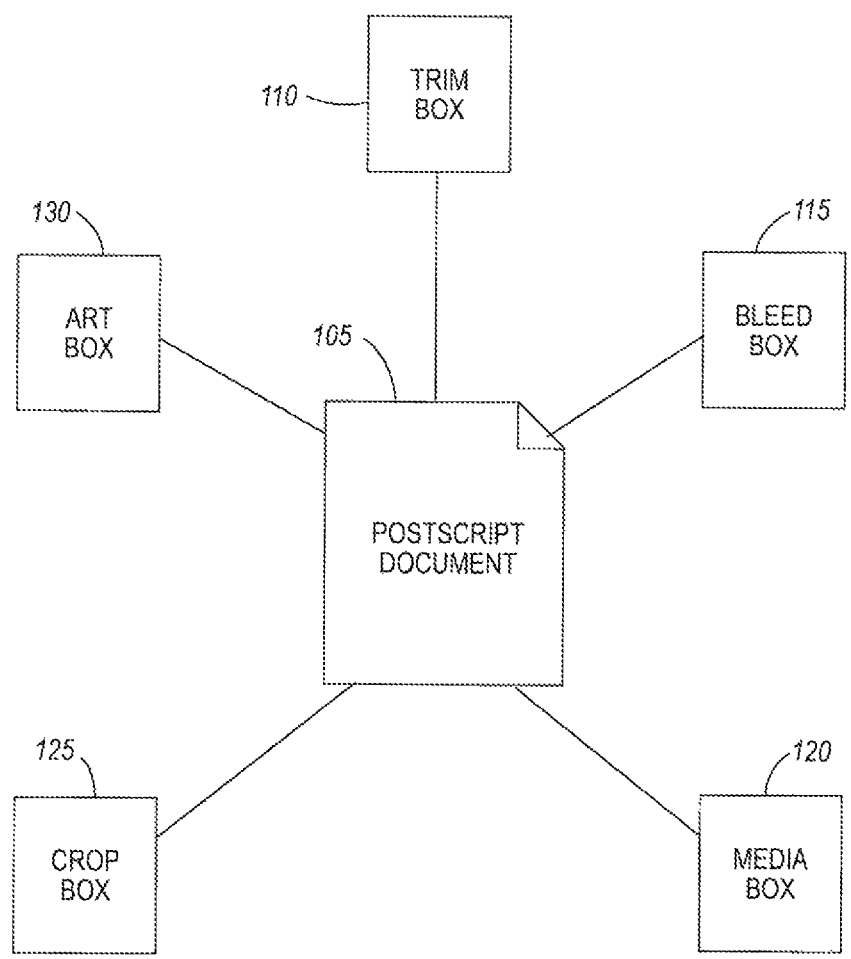
FIG. 1 illustrates an exemplary depiction of a document and components thereof, in accordance with embodiments.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one or is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Existing computing systems can be too large and/or complex to be designed, developed, or understood by a single individual. In some cases, a component included in a system can be previously designed by an entity different from the entity building the system, and the component designers do not always consider a system application implementation when designing and building the component.

In particular, print production workflows can comprise components that are previously designed without consideration for a future system application implementation. For example, print production workflow systems can be built from components created by Xerox®, Adobe®, EFI®, EnFocus®, Kodak®, IBM®, Aprimo®, ZMPie®, and others. The workflows can be automated and sophisticated, but can also be fragile. For example, when a new document is sent to the workflow, the document will not always pass successfully through all of the workflow steps. Further, a document can succeed through a first pass of the workflow steps and then, unchanged, fail on a second pass. For further example, upon a workflow component updating to a new version (e.g. a new version of Adobe® Acrobat®), a document that previously succeeded can fail when it is sent through the updated workflow, even though the new version is configured identically to the older version.

A problem for the fragility of computing systems can be language ambiguities. For example, like natural languages, PostScript® ("PostScript"), and other programming languages, can be ambiguous in expressing statements. More particularly, print drivers can interact with software applications (e.g. Adobe® InDesign®, Kodak® Preps®, and others) to create PostScript files so that workflow components, such as a raster image processor (RIP), an imposition application, a preflight application, and others, can consume the files, update the files, emit new versions of the files that reflect the update, and send the files to the next component in the workflow.

For illustrative purposes, the PostScript file that each component emits can be thought of as a particular "dialect" of PostScript, and exactly what the dialect looks like can depend on the thought process of the software developers or other entities who created the component. While each dialect can conform to the PostScript specification, each phrase of the dialect, or the way in which the dialect expresses a print instruction, can be composed in a significantly different way than a different dialect emitted by components in the same workflow. As a result, these components can interpret different phrasings as semantically different, or even as errors, even when they are not different.

Because the PostScript consumers of the workflow do not always understand or comprehend the dialect in which the PostScript was written, then if one component can consume a PostScript file and use it correctly, that does not mean that another component will also be able to consume and correctly interpret the same PostScript file. For example, if Component A creates PostScript file A, and Component B consumes PostScript file A and uses it correctly, then this does not imply that Component C can consume PostScript file A and use it correctly. Further, if Component D also creates PostScript file A with the same content and configuration settings used by Component A, then this does not imply that Component B will be able to successfully consume the file from Component D. Stated differently, in systems in which components may consume instructions written in any other component's dialect, the likelihood can be high that at least one component will not fully "understand" what is being expressed.

In addition, system fragility can be more likely because complex systems can be deeply integrated. In particular, every configuration setting in a production workflow component can affect every other workflow component. As a result, any change to a workflow's configuration can cause the workflow to stop operating properly. For example, the following lists changes that can disrupt print production workflows: changing the paper's grain direction, changing the model of printer being used, changing the stops on the finisher, changing the imposition, changing the content of the original document, and similar changes. Because some end users may not realize that the changes can disrupt the workflow, end user dissatisfaction can result.

Moreover, modifying or changing workflow elements or any part of the target document or its instructions can require changing at least one other workflow element and/or part of the original document. However, changing the other workflow element and/or part of the original document can result in a necessary change to yet another element. In such tightly dependent systems, such as in some present systems, each component may need to understand the dialect of any of the other components, not just the components predicted to immediately precede it, such as in a workflow. The combination of the interdependencies along with the potential for misunderstanding among the system components can produce system behaviors that appear chaotic.

Embodiments as described herein generally relate to systems and methods for comparing different configurations of system components. The systems and methods can enable system components to share information, for example using different dialects of a common language, with less misunderstanding than seen in current systems. In embodiments, the systems and methods comprises a processing module that can identify, in two or more phrases, the parts of the phrases that are the same and the parts of the phrases that are different. The processing module can assign a meaning to the parts of the phrases which are different, and identify whether the differences produce a different overall meaning for the different phrases, or the same overall meaning for the different phrases.

Referring to FIG. 1, the PostScript language can use various types of bounding boxes that can describe the content and appearance of a PostScript document 105. In particular, a Trim Box 110, as understood herein, can define the intended dimensions of a finished page associated with the PostScript document 105. In particular, the Trim Box 110 can define the actual page size and is used by imposition programs and workflows as a basis for position pages on a press sheet. Further, the Bleed Box 115, as understood herein, can determine a region to which the page contents need to be clipped when output in a production environment. In embodiments, the Bleed Box 115 can be 3 to 5 millimeters, or other values, larger than the Trim Box 110.

The Media Box 120, as understood herein, can define a width and height of the page, and can correspond to the actual size of the page. Further, the Crop Box 125, as understood herein, can define the region to which the page contents, and not the page size, are to be clipped. Still further, the Art Box 130, as understood herein, can define a region within a page that is of special interest. In embodiments, the Art Box 130 can be used to handle advertisements, such as, for example, defining a size of any advertisements.

Figure 2:
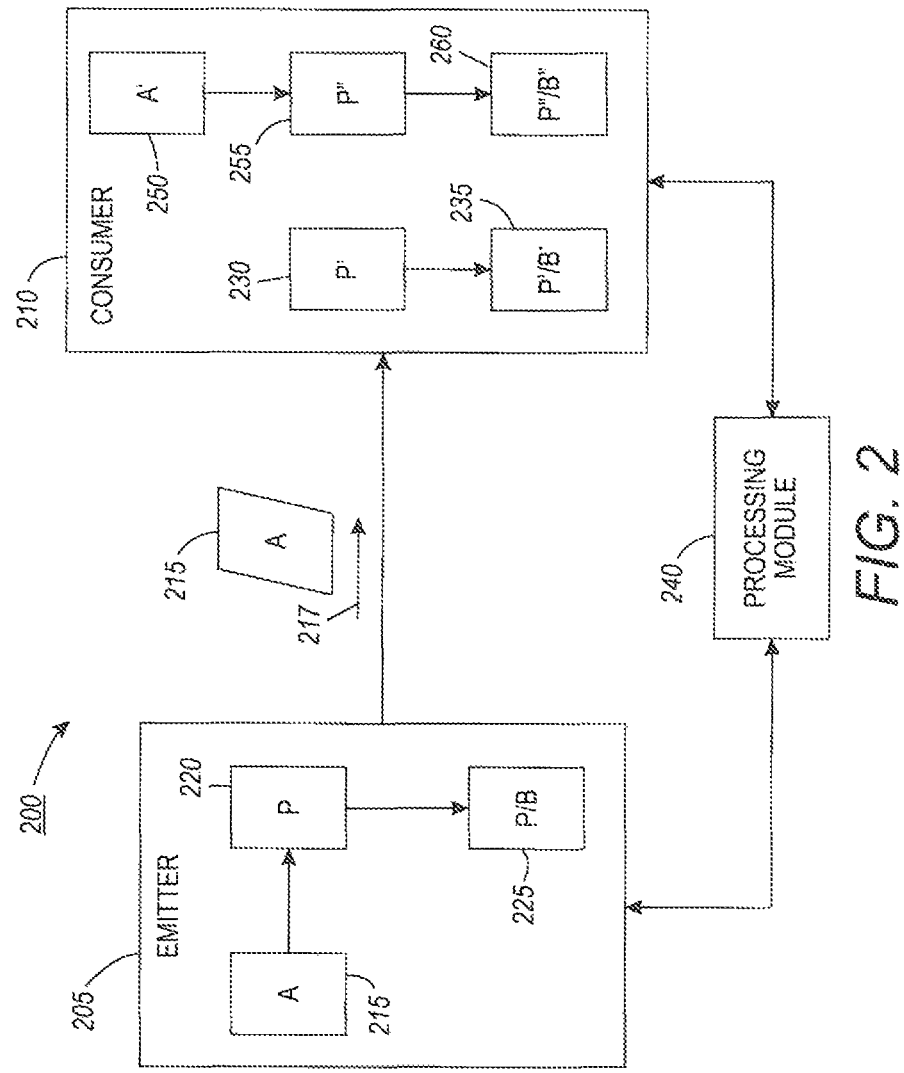
FIG. 2 illustrates an exemplary environment of components in systems and methods for reducing ambiguities in language semantics, in accordance with embodiments.

FIG. 2 illustrates an exemplary environment 200 of components in systems and methods for reducing ambiguities in language semantics. It should be appreciated that the environment 200 as outlined in FIG. 2 is merely exemplary and that other components and functionality can be added or removed.

As shown in FIG. 2, the environment 200 comprises an emitter 205 and a consumer 210. In embodiments, the emitter 205 can correspond to a software application or workflow component that can interface with print drivers or other programs, create PostScript files, and other functions. Further, in embodiments, the consumer 210 can correspond to a workflow component that can be configured to receive the PostScript file from the emitter 205, as well as consume the file, interpret the file, update the file, emit a new version of the file that can reflect the update, and send the file to other components of a workflow, and other functions.

As shown in FIG. 2, the emitter can create a PostScript file (A) 215 that can contain one or more phrases that can describe an underlying document associated with the file 215. For example, and for purposes of describing a scenario as used throughout the description of FIG. 2, one of the phrases ("phrase 1") can contain the language "different size Trim Box and Bleed Box." Using the file 215, the emitter 205 can build a pattern ensemble (P) 220 that can contain one or more layers. In embodiments, each layer can describe an interpretation, by the emitter 205, of a phrase expressed in the file 215 that the emitter 205 has produced. For example, a layer (P/B) 225 can describe an interpretation, by the emitter 205, of phrase 1.

As shown in FIG. 2, the emitter 205 can send the file 215 to the consumer 210, as indicated by 217. Upon receipt of the file 215, the consumer 210 can generate an additional pattern ensemble (P') 230 based on the file 215, and containing one or more layers. In embodiments, each layer of the additional pattern ensemble 230 can describe an interpretation, by the consumer 210, of a phrase expressed in the file 215. For example, a layer (P'/B') 235 can describe an interpretation, by the consumer 210, of phrase 1. For purposes of describing the scenario of the environment 200, the consumer 210 can interpret phrase 1 as the Trim Box and the Bleed Box having the same size.

According to present embodiments, the environment 200 can comprise a processing module 240 that can be configured to interface with or otherwise connect to the emitter 205 and the consumer 210. The processing module 240 can conduct a comparison, error checking process, or similar type of service with the pattern ensemble 220 and the additional pattern ensemble 230, and other data files. In embodiments, the processing module 240 can retrieve or otherwise receive the pattern ensemble 220 and the additional pattern ensemble 230 from the emitter 205 and the consumer 210, respectively. In other embodiments, one or both of the emitter 205 and the consumer 210 can request the processing module 240 to compare the pattern ensemble 220 to the additional pattern ensemble 230.

If the processing module 240 determines that the pattern ensemble 220 is the same, or essentially the same, as the additional pattern ensemble 230, then the processing module 240 can inform the consumer 210 to continue an intended operation, or can inform other entities with a result of the comparison. In embodiments, the processing module 240 can compare the results of the comparison with a similarly threshold, or other metrics, and if the similarity threshold is met or exceeded, then the pattern ensemble 220 can be deemed to be the same as the additional pattern ensemble 230. With respect to the scenario, the processing module 240 can determine that the pattern ensemble 220 is different from the additional pattern ensemble 230. In particular, the processing module 240 can determine that the pattern in the layer (P/B) 225 is different from the pattern in the layer (P'/B') 235. In embodiments, the processing module 240 can determine that the difference in patterns is enough to cause, or potentially cause, a failure in a workflow.

In response to detecting the difference, the processing module 240 or other logic can report the difference to the emitter 205, the consumer 210, and/or other entities. In embodiments, the reporting can be conducted via an indication, communication, message, and/or the like, through any type of data transmission or network. Further, the processing module 240 can send the "correct" interpretation of the phrase to the consumer 210 and/or other entities. With respect to the scenario, the processing module 240 can send the "correct" interpretation (the layer (P/B) 225) to the consumer 210. By sending just the layer, the input/output processing of the processing module 240 and other entities can be reduced, however it should be appreciated that the processing module 240 and other entities can send and/or receive other data, such as any associated PostScript files. In some embodiments, the processing module 240 can execute or interface with an additional service or application to aid in determining similarities and/or differences between interpretations.

When the consumer 210 receives notification of the difference in interpretations, the consumer 210 or other logic can examine the file 215 to identify the portion of the file 215 that the consumer 210 misinterpreted. Next, the consumer 210 can proceed with its standard or intended operation, such as, for example, an operation in accordance with a print workflow or a document supply-chain management workflow. When the consumer 210 is finished with the standard or intended operation, the consumer 210 can create a new PostScript file A' 250 that can represent the changes that the consumer 210 made to the original file 215. In embodiments, the consumer 210 can create a new pattern ensemble (P") 255 and a corresponding layer (P"/B") 260 that can represent the consumer's 210 interpretation of the various bounding boxes. Once the pattern ensemble (P") 255 and the corresponding layer (P"/B") 260 are created, the consumer 210 can send the new pattern ensemble (P") 255 to the processing module 240.

Upon receipt of the new pattern ensemble (P") 255, the processing module 240 can compare the new pattern ensemble (P") 255, and the corresponding layer (P"/B") 260, to the pattern ensemble 220 and the corresponding layer (P/B) 225. If the processing module 240 identifies a difference, significant or otherwise, the processing module 240 can notify the consumer 210 of the difference. In response, the consumer 210 can identify a relevant section of the file 215, such as the section that describes the sizes of the boxes as described with respect to the scenario, and replace the associated section in the new PostScript file A' 250 with the relevant section from the file 215. In effect, with respect to the scenario, a new PostScript file (A") (not shown in figures) is created that comprises the "correct" interpretation of the Trim Box and the Bleed Box sizes (i.e. that the size of the Trim Box is different from the size of the Bleed Box, as originally intended).

In embodiments, to handle errors and other workflow crashes, the consumer 210 or other entities can be configured to cache interpretations for a certain configurable time period. The cached data, such as pattern ensembles, can be tried to check if any would prevent a workflow crash. If an option is found locally from the cache, then the crash can be self-corrected and the associated transmission can be avoided.

Figure 3:
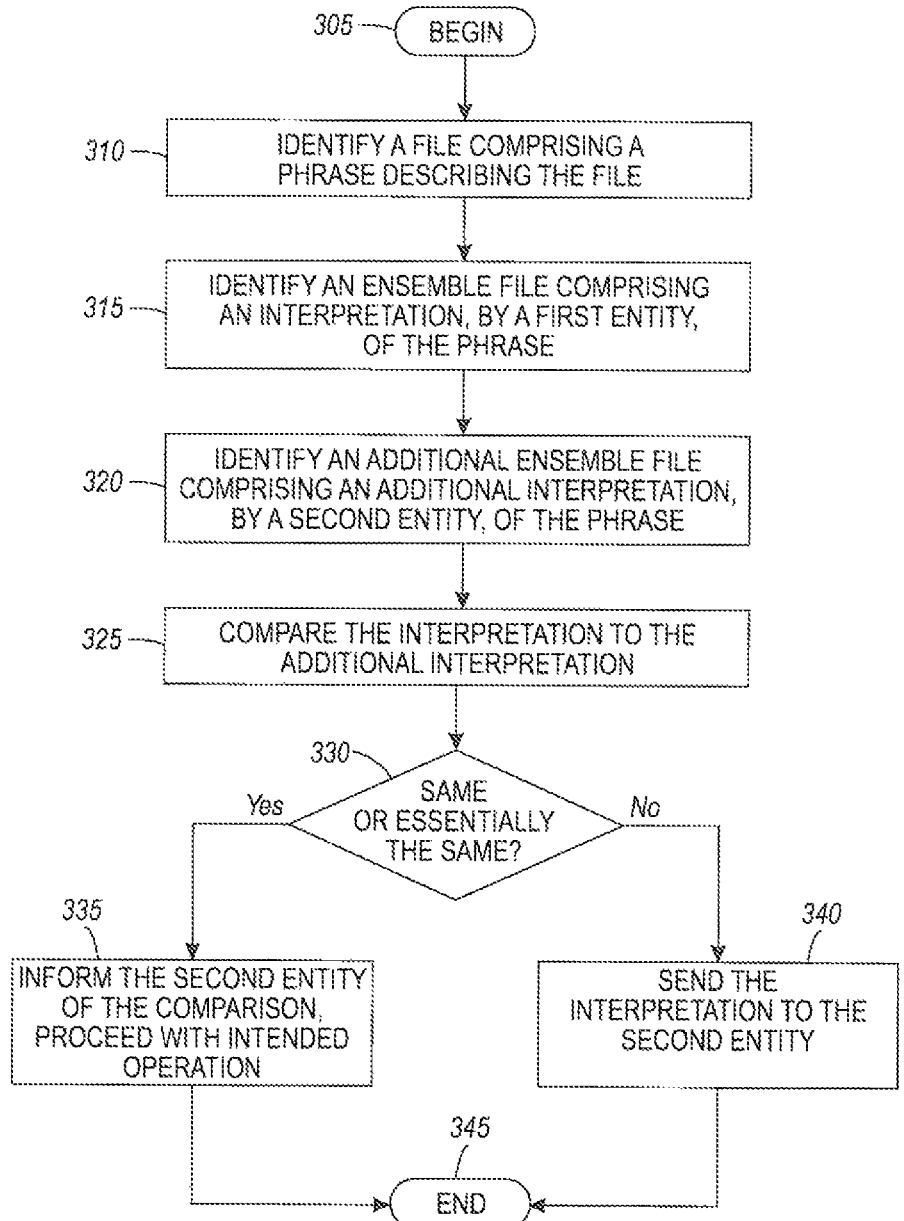
FIG. 3 illustrates an exemplary flow diagram of processing data in accordance with another embodiment.

Referring to FIG. 3, depicted is a flowchart detailing a technique 300 used to reduce ambiguities in language semantics among computing system components. It should be readily apparent to those of ordinary skill in the art that the flow diagram depicted in FIG. 3 represents a generalized illustration and that other steps can be added or existing steps can be removed or modified.

In 305, processing can begin. In 310, a file comprising a phrase describing the file can be identified. In embodiments, a first entity, such as an emitter, can create the file as a PostScript file. In 315, an ensemble file comprising an interpretation, by a first entity, of the phrase can be identified. In embodiments, the first entity can build the ensemble file with one or more layers, with one of the layers describing the first entity's interpretation of the phrase. In 320, an additional ensemble file comprising an additional interpretation, by a second entity, of the phrase can be identified. In embodiments, the second entity can build the additional ensemble file with one or more layers, with one of the layers describing the second entity's interpretation of the phrase.

In 325, the interpretation can be compared to the additional interpretation. In embodiments, a processing module or other logic can perform the comparison. In 330, it can be determined whether the additional interpretation is the same or essentially the same as the interpretation. In embodiments, the processing module or other logic can compare the specified layer of the ensemble file to the associated layer of the additional ensemble file.

If the additional interpretation is the same or essentially the same as the interpretation, then processing can proceed to 335 in which the second entity can be informed of the comparison, and the second entity can proceed with an intended operation. In contrast, if the additional interpretation is neither the same nor essentially the same as the interpretation, then processing can proceed to 340 in which the interpretation can be sent to the second entity. In embodiments, the second entity can create a new file containing the interpretation, by the first entity, of the phrase. In 345, processing can end, repeat, or return to any of the previous steps.

Figure 4:
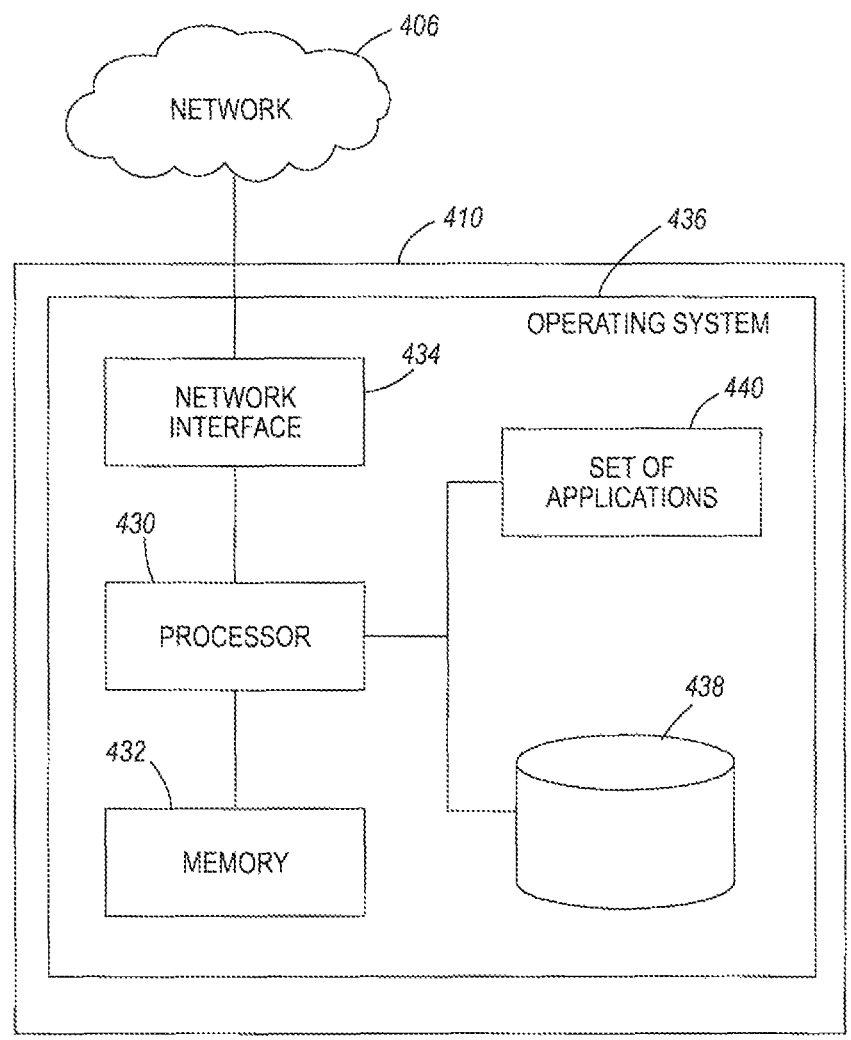
FIG. 4 illustrates a hardware diagram in accordance with another embodiment.

FIG. 4 illustrates an exemplary diagram of hardware and other resources that can be incorporated with processing and logic associated with the present embodiments. As shown in FIG. 4, a server 410 can be configured to communicate with a network 406. In embodiments as shown, the server 410 can comprise a processor 430 communicating with memory 432, such as electronic random access memory, or other forms of transitory or non-transitory computer readable storage mediums, operating under control of or in conjunction with an operating system 436. The operating system 436 can be any commercial, open-source, or proprietary operating system or platform. The processor 430 can communicate with a database 438, such as a database stored on a local hard drive. While illustrated as a local database in the server 410, the database 438 can be separate from the server 410.

The processor 430 can further communicate with a network interface 434, such as an Ethernet or wireless data connection, which in turn communicates with the network 406, such as the Internet or other public or private networks. The processor 430 can also communicate with the database 438 or any applications 440, such as applications associated with the processing module 240, to execute control logic and perform data processing, as described herein.

While FIG. 4 illustrates the server 410 as a standalone system comprising a combination of hardware and software, the server 410 can also be implemented as a software application or program capable of being executed by a conventional computer platform. For example, it should be understood that the components of the server 410 can be implemented on user PCs or other hardware such that the user PCs can communicate directly with the database 438. Likewise, the server 410 can also be implemented as a software module or program module capable of being incorporated in other software applications and programs. In either case, the server 410 can be implemented in any type of conventional proprietary or open-source computer language.

Certain embodiments can be performed as a computer program. The computer program can exist in a variety of forms both active and inactive. For example, the computer program can exist as software program(s) comprised of program instructions in source code, object code, executable code or other formats; firmware program(s); or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of processing data, the method comprising:
   identifying a file comprising a phrase describing the file, and an ensemble file comprising an interpretation, by an emitter configured to interface with a print driver, of the phrase, wherein the ensemble file comprises a layer comprising the interpretation, wherein the phrase describes a plurality of bounding boxes associated with the file, the plurality of bounding boxes comprising at least one trim box, at least one bleed box, and at least one media box;
   sending the file from the emitter to a consumer configured to update the file, wherein the consumer is different from the emitter;
   identifying an additional ensemble file comprising an additional interpretation, by the consumer, of the phrase, wherein the additional ensemble files comprises an additional layer comprising the additional interpretation;
   comparing, by a processor, the interpretation to the additional interpretation, wherein a result of the comparing indicates that the interpretation is neither the same nor essentially the same as the additional interpretation; and
   providing a result of the comparison to the consumer; and
   sending the interpretation to the consumer.

2. The method of claim 1, wherein the emitter creates the file and builds the ensemble file, and wherein the consumer builds the additional ensemble file.

3. The method of claim 1, wherein, in response to sending the interpretation to the consumer, the consumer:
   - proceeds with an intended operation;
   - creates a new file representing a difference between the interpretation and the additional interpretation;
   - locates the phrase describing the file; and
   - replaces an associated section of the new file with the phrase describing the file.

4. The method of claim 1, wherein sending the interpretation to the consumer comprises sending a layer built by the emitter and comprising the interpretation.

5. The method of claim 1, wherein the file is a PostScript file.

6. The method of claim 1, wherein the file is related to a print production workflow.

7. A system for processing data, the system comprising:
   - a processor coupled to memory and configured to perform actions comprising:
     - identifying a file comprising a phrase describing the file, and an ensemble file comprising an interpretation, by an emitter configured to interface with a print driver, of the phrase, wherein the ensemble file comprises a layer comprising the interpretation, wherein the phrase describes a plurality of bounding boxes associated with the file, the plurality of bounding boxes comprising at least one trim box, at least one bleed box, and at least one media box;
     - sending the file from the emitter to a consumer configured to update the file, wherein the consumer is different from the emitter;
     - identifying an additional ensemble file comprising an additional interpretation, by the consumer, of the phrase, wherein the additional ensemble files comprises an additional layer comprising the additional interpretation;
     - comparing, by a processor, the interpretation to the additional interpretation, wherein a result of the comparing indicates that the interpretation is neither the same nor essentially the same as the additional interpretation;
     - providing a result of the comparison to the consumer; and
     - sending the interpretation to the consumer.

8. The system of claim 7, wherein the emitter creates the file and builds the ensemble file, and wherein the consumer builds the additional ensemble file.

9. The system of claim 7, wherein, in response to sending the interpretation to the consumer, the consumer:
   - proceeds with an intended operation;
   - creates a new file representing a difference between the interpretation and the additional interpretation;
   - locates the phrase describing the file; and
   - replaces an associated section of the new file with the phrase describing the file.

10. The system of claim 7, wherein sending the interpretation to the consumer comprises sending a layer built by the emitter and comprising the interpretation.

11. The system of claim 7, wherein the file is a PostScript file.

12. The system of claim 7, wherein the file is related to a print production workflow.

* * * * *